(12) United States Patent
Tanabe et al.

(10) Patent No.: US 9,856,907 B2
(45) Date of Patent: Jan. 2, 2018

(54) DOUBLE-LINK PISTON CRANK MECHANISM FOR INTERNAL COMBUSTION ENGINE

(71) Applicant: NISSAN MOTOR CO., LTD., Yokohama-shi, Kanagawa (JP)

(72) Inventors: Takashi Tanabe, Kanagawa (JP); Makoto Kobayashi, Kanagawa (JP); Katsuya Moteki, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/913,054

(22) PCT Filed: Jul. 30, 2014

(86) PCT No.: PCT/JP2014/070018
§ 371 (c)(1),
(2) Date: Feb. 19, 2016

(87) PCT Pub. No.: WO2015/025683
PCT Pub. Date: Feb. 26, 2015

(65) Prior Publication Data
US 2016/0201717 A1    Jul. 14, 2016

(30) Foreign Application Priority Data

Aug. 22, 2013 (JP) .................... 2013-171808

(51) Int. Cl.
*F02B 75/32* (2006.01)
*F16C 7/02* (2006.01)
(Continued)

(52) U.S. Cl.
CPC ............. *F16C 7/023* (2013.01); *F01M 11/02* (2013.01); *F02B 41/04* (2013.01); *F02B 75/045* (2013.01);
(Continued)

(58) Field of Classification Search
CPC ...... F16C 3/18; F16C 3/16; F16C 3/14; F02B 75/04; F16J 1/14
(Continued)

(56) References Cited

U.S. PATENT DOCUMENTS 6,481,389 B2    11/2002    Suzuki et al.
7,059,280 B2 *   6/2006    Nohara ................. F02D 15/02
                                                     123/48 D
2012/0111143 A1 *  5/2012    Tanabe .................. F16C 3/14
                                                     74/602

FOREIGN PATENT DOCUMENTS

JP          4-47113 U    4/1992
JP          4-105911 U   9/1992
(Continued)

OTHER PUBLICATIONS

Wikipedia, Engine Knocking, 2004, Wikipedia, pp. 1-2 en.wikipedia.org/wiki/Engine_knocking.*
(Continued)

*Primary Examiner* — Jacob Amick
*Assistant Examiner* — Charles Brauch
(74) *Attorney, Agent, or Firm* — Foley & Lardner LLP

(57) ABSTRACT

An opening on one end side of a pin-boss oil passage opens to the inner circumferential surface of a pin boss part of an upper link, while an opening on the other end side thereof opens to the outer circumferential surface of the pin boss part of the upper link. A lower-link oil passage has a one-end-side opening structured to open to a pin-boss-facing surface of the lower link facing the outer circumferential surface of the pin boss part of the upper link and its other-end-side opening structured to open to a crankpin bearing surface. The lower-link oil passage is configured to point, at a prescribed crankangle, to a specified end edge of end edges of the other-end-side opening of the pin-boss oil (Continued)

passage, the specified end edge facing one end side of the upper link.

7 Claims, 3 Drawing Sheets

(51) Int. Cl.
*F02B 75/04* (2006.01)
*F16C 3/14* (2006.01)
*F02B 41/04* (2006.01)
*F01M 11/02* (2006.01)
*F16C 3/16* (2006.01)
*F16C 3/18* (2006.01)
*F16J 1/14* (2006.01)
*F01M 1/06* (2006.01)

(52) U.S. Cl.
CPC ......... *F16C 3/14* (2013.01); *F01M 2001/062* (2013.01); *F01M 2011/027* (2013.01); *F02B 75/04* (2013.01); *F16C 3/16* (2013.01); *F16C 3/18* (2013.01); *F16J 1/14* (2013.01)

(58) Field of Classification Search
USPC ....................................................... 123/197.3
See application file for complete search history.

(56) References Cited

FOREIGN PATENT DOCUMENTS

| | | | |
|---|---|---|---|
| JP | 8-200150 A | | 8/1996 |
| JP | 8-200152 A | | 8/1996 |
| JP | 2001-200711 A | | 7/2001 |
| JP | 2010-185329 A | | 8/2010 |
| JP | 2010185329 | * | 8/2010 |
| JP | 2010185329 A | * | 8/2010 |
| JP | 2010185529 | * | 8/2010 |
| KR | 2005032145 A | * | 4/2005 |

OTHER PUBLICATIONS

Wayback Machine, Feb. 2017, Wayback Machine, p. 1, https://web.archive.org/web/*/https://en.wikipedia.org/wiki/Engine_knocking.*

* cited by examiner

US 9,856,907 B2

DOUBLE-LINK PISTON CRANK MECHANISM FOR INTERNAL COMBUSTION ENGINE

TECHNICAL FIELD

The present invention relates to a double-link piston crank mechanism for an internal combustion engine.

BACKGROUND ART

Conventionally known is a double-link piston crank mechanism equipped with an upper link connected at one end through a piston pin to a piston, a lower link connected through an upper pin to the other end of the upper link and connected to a crankpin of a crankshaft, and a control link rockably supported at one end by an engine body side and connected at the other end through a control pin to the lower link.

A large combustion pressure received by the piston is inputted from an upper-pin bearing portion to the lower link through the piston pin, the upper link, and the upper pin. At the same time, to balance with the previously-noted combustion load, loads are produced in a crankpin bearing portion and a control-pin bearing portion, respectively. Therefore, the bearing pressures of these bearing portions are severer as compared to a general single-link reciprocating engine. Hence, to prevent abrasion or seizing from occurring, maintaining of an adequate lubricating state is required.

For instance, Patent document 1 discloses a double-link piston crank mechanism having an oil passage formed in a crankshaft, a crankpin oil passage formed in a crankpin, a lower-link oil passage formed in a lower link, and a pin-boss oil passage positioned on the extended line of the lower-link oil passage as viewed in an axial direction of the crankshaft and formed in an upper-link pin boss part onto which an upper pin is rotatably fitted. The double-link piston crank mechanism is further configured such that the crankpin oil passage and the lower-link oil passage are brought into fluid-communication with each other at a prescribed crank angle so as to feed part of lubricating oil jetted from the lower-link oil passage through the pin-boss oil passage to an upper-pin bearing portion.

However, assuming that position-setting of the lower-link oil passage with respect to the pin-boss oil passage is improper, the anti-seizing property of the upper-pin bearing portion tends to lower owing to an insufficient supply of lubricating oil. For instance, when the operating range of the internal combustion engine is a high speed range, it is difficult to jet out lubricating oil in the direction in which the lower-link oil passage opens owing to a force of inertia. In particular, in a configuration such that a pin-boss oil passage is positioned on the extended line of a lower-link oil passage, adequate lubricating oil cannot be necessarily fed to the pin-boss oil passage.

CITATION LIST

Patent Literature

Patent document 1: Japanese Patent Provisional Publication No. JP2010-185329

SUMMARY OF INVENTION

It is, therefore, in view of the above, the double-link piston crank mechanism of the invention is characterized in that a crankpin oil passage and a lower-link oil passage are brought into fluid-communication with each other at a prescribed crank angle for jetting out lubricating oil from an opening on one end side of the lower-link oil passage, and that the one-end-side opening of the lower-link oil passage is formed so as to point, at the prescribed crank angle, to a specified end edge of end edges of the other-end-side opening of a pin-boss oil passage as viewed in an axial direction of the crankshaft, the specified end edge facing on a traveling direction side of a pin boss part in which the pin-boss oil passage is formed.

This permits the specified portion of the pin boss part, in which the pin-boss oil passage is formed, to travel within a spray area of lubricating oil sprayed beforehand from the one-end-side opening of the lower-link oil passage at the timing immediately after the prescribed crank angle.

According to the invention, even with the internal combustion engine operating in a high speed range, when the pin boss part passes through a spray area of lubricating oil sprayed beforehand from the one-end-side opening of the lower-link oil passage, lubricating oil within the spray area can be introduced from the pin-boss oil passage and the like, and then fed into the bearing portion of the pin boss part. Hence, it is possible to relatively increase lubricating oil fed into the bearing portion of the pin boss part, thus enhancing the anti-seizing property of the pin boss part.

DESCRIPTION OF EMBODIMENTS

One embodiment of the present invention is hereinafter described in detail with reference to the drawings.

Figure 1:
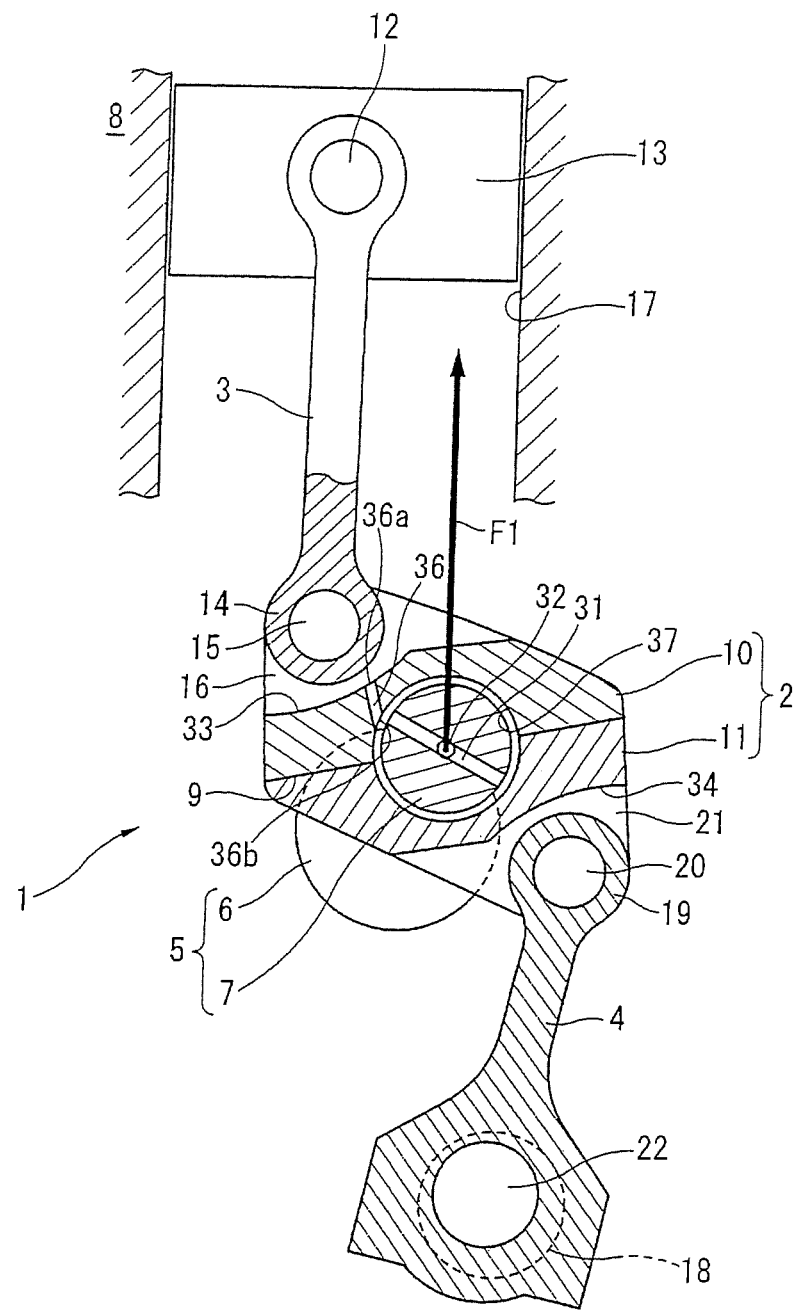
FIG. 1 is an explanatory view schematically illustrating a double-link piston crank mechanism for an internal combustion engine according to the invention.

FIG. 1 is an explanatory view schematically illustrating the outline configuration of a double-link piston crank mechanism 1 for an internal combustion engine, to which the invention is applied, as viewed in the axial direction of a crankshaft.

The double-link piston crank mechanism 1 is mainly comprised of three links (described later), that is, a lower link 2, an upper link 3, and a control link 4. In the shown embodiment, the double-link piston crank mechanism is configured as a variable compression ratio mechanism that varies a piston top dead center (TDC) position.

The crankshaft 5 is equipped with a plurality of journal parts 6 and a plurality of crankpins 7, such that journal parts 6 are rotatably supported by respective main bearings of a cylinder block 8. Crankpin 7 is displaced from the journal part 6 by a predetermined amount of eccentricity. Lower link 2 is rotatably installed on the crankpin.

For the purpose of installing the lower link on the crankpin 7, lower link 2 is configured such that the lower link can be split into two members, namely upper and lower half-split members. That is, lower link 2 is mainly constructed by a pair of lower-link split members 10, 11, vertically divided along a divided surface 9, which passes through the center of crankpin 7.

Upper link 3 is rotatably connected on one end side (i.e., at the upper end) to a piston 13 by a piston pin 12. A pin boss part 14, which is the other end side (i.e., the lower end) of the upper link, is rotatably connected to one-end-side pin boss part 16 of lower link 2 by a first connecting pin 15. Piston 13 reciprocates in a cylinder 17 of cylinder block 8.

Regarding control link 4 that restricts motion of lower link 2, the lower end (i.e., one end side of the control link) is connected through a control shaft 18 to the lower section of cylinder block 8 constructing part of the main body of the engine. A pin boss part 19, corresponding to the upper end (i.e., the other end side of the control link) is connected to the other-end-side pin boss part 21 of lower link 2 by a second connecting pin 20. Control shaft 18 is rotatably supported by the engine body, and structured to have an eccentric cam part 22 whose geometric center is eccentric to the center of rotation of the control shaft. The lower end (i.e., the one end side of control link 4) is rotatably connected to the eccentric cam 22. A rotational position of control shaft 18 is controlled by means of a compression-ratio control actuator (not shown), which is operated based on a control signal from an engine control unit (not shown).

In the previously-discussed double-link piston crank mechanism 1, when control shaft 18 is rotated by the compression-ratio control actuator, the center position of eccentric cam part 22, in particular, the relative position of the eccentric cam part with respect to the engine body is changed. Therefore, the rockably supported position (the rocking fulcrum) of the lower end of control link 4 is changed. Immediately when the rockably supported position of control link 4 changes, the stroke of piston 13 changes and thus the top dead center (TDC) position of piston 13 becomes higher or lower. In this manner, the engine compression ratio can be varied.

Also, a crankpin oil passage 31 is formed in the crankpin 7. Crankpin oil passage 31 is formed to radially extend straight the inside of the crankpin 7, while passing through the crankpin center as viewed in the axial direction of the crankshaft. In the embodiment, both ends of the crankpin oil passage are structured to open to the outer circumferential surface of crankpin 7. Lubricating oil, pressurized by an oil pump (not shown), is fed into the crankpin oil passage 31 through an axial oil passage 32 formed to extend along the axial direction of crankshaft 5.

The one-end-side pin boss part 16 of lower link 2 is provided at the lower-link split member 10 and formed into a forked shape in a manner so as to sandwich the pin boss part 14 positioned on the other end side of upper link 3, such that the forked sections oppose a pair of outer side faces of pin boss part 14. The first connecting pin 15 is configured to rotatably penetrate the pin boss part 14 of upper link 3 and fixedly connected to the one-end-side pin boss part 16 of lower link 2, whose both ends are formed as the forked sections, by press-fitting. An elongated pin-boss-facing surface 33 is provided between the forked sections of the one-end-side pin boss part 16, such that the elongated pin-boss-facing surface faces the outer circumferential surface of the pin boss part 14 of upper link 3. The pin-boss-facing surface 33 is contoured and formed into a curved surface.

The other-end-side pin boss part 21 of lower link 2 is provided at the lower-link split member 11 and formed into a forked shape in a manner so as to sandwich the pin boss part 19 positioned on the other end side of control link 4, such that the forked sections oppose a pair of outer side faces of pin boss part 19, such that the forked sections oppose a pair of outer side faces of pin boss part 19. The second connecting pin 20 is configured to rotatably penetrate the pin boss part 19 of control link 4 and fixedly connected to the other-end-side pin boss part 21 of lower link 2, whose both ends are formed as the forked sections, by press-fitting. An elongated pin-boss-facing surface 34 is provided between the forked sections of the other-end-side pin boss part 21, such that the elongated pin-boss-facing surface faces the outer circumferential surface of the pin boss part 19 of control link 4. The pin-boss-facing surface 34 is contoured and formed into a curved surface.

Figure 2:
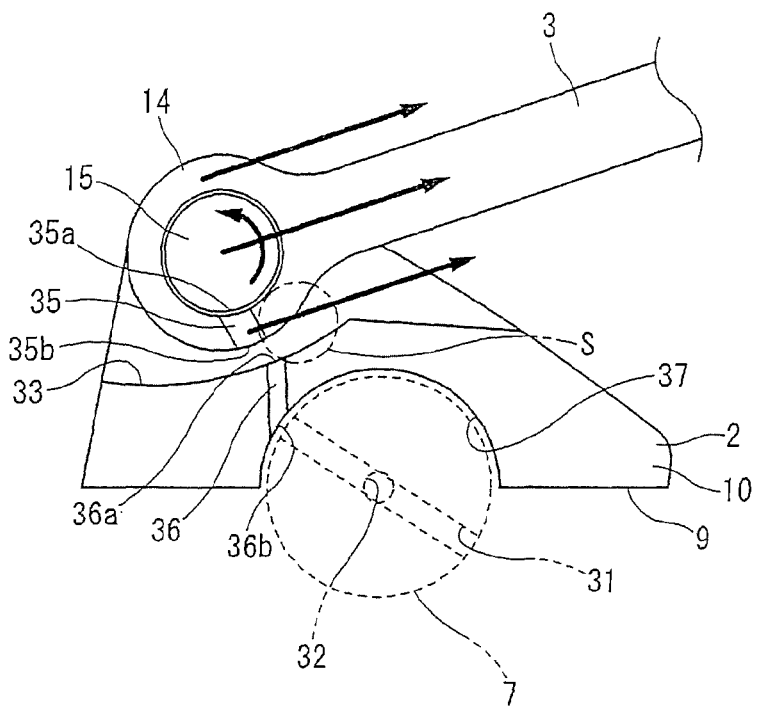
FIG. 2 is an enlarged explanatory view illustrating the essential part of the invention.

As shown in FIG. 2, in the double-link piston crank mechanism 1 of the embodiment, a pin-boss oil passage 35 is formed in the pin boss part 14 positioned on the other end side of upper link 3, whereas a lower-link oil passage 36 is formed in the lower-link split member 10.

Pin-boss oil passage 35 is formed in one of the outer side faces of pin boss part 14 as a surface groove, such that one-end-side opening 35a opens to the inner circumferential surface of the pin boss part 14 of upper link 3 and that the other-end-side opening 35b opens to the outer circumferential surface of the pin boss part 14 of upper link 3. By the way, pin-boss oil passage 35 may be formed as a through hole that penetrates the pin boss part 14.

Lower-link oil passage 36 is formed as a through hole that penetrates the lower-link split member 11, and has one-end-side opening 36a structured to open to the pin-boss-facing surface 33 and the other-end-side opening 36b structured to open to a crankpin bearing surface 37. Additionally, lower-link oil passage 36 is structured to be brought into fluid-communication with the crankpin oil passage 31 at a prescribed crank angle (for example, at a bottom dead center) for jetting out lubricating oil from the one-end-side opening 36a.

Furthermore, the lower-link oil passage 36 is formed so as to point, at the above-mentioned prescribed crank angle, to a specified end edge of end edges of the other-end-side opening 35b of pin-boss oil passage 35 formed in the pin boss part 14 of upper link 3, the specified end edge facing on a traveling direction side of the pin boss part 14. In other words, the lower-link oil passage 36 is formed so as to point, at the above-mentioned prescribed crank angle, to a specified end edge of end edges of the other-end-side opening 35b of pin-boss oil passage 35 formed in the pin boss part 14 of upper link 3, the specified end edge facing on the one end side of upper link 3.

Pin boss part 14, which is positioned on the other end side of upper link 3 and in which the pin-boss oil passage 35 is formed, moves with rotary motion as indicated by the arrows in FIG. 2, as the piston nears toward the top dead center position from the position corresponding to the prescribed crank angle. Hence, the specified portion of the other-end-side pin boss part of the upper link, in which the pin-boss oil passage is formed, moves within a spray area "S" of lubricating oil sprayed beforehand from the one-end-side opening 36a of lower-link oil passage 36, while increasing the included angle between upper link 3 and lower link 2. Therefore, even with the internal combustion engine operating in a high speed range, lubricating oil within the spray area "S" can be introduced from the pin-boss oil passage 35, and then fed into the bearing portion of pin boss part 14 of upper link 3.

That is, even when the operating range of the internal combustion engine is a high speed range, it is possible to more efficiently feed lubricating oil into the bearing portion of pin boss part 14 of upper link 3 in comparison with the configuration such that lubricating oil is sprayed from the lower-link oil passage 36 at the timing such that pin-boss oil passage 35 is positioned on the extended line of lower-link oil passage 36.

Hence, it is possible to relatively increase lubricating oil fed into the bearing portion of pin boss part 14, which is positioned on the other end side of upper link 3, thus enhancing the anti-seizing property of the pin boss part 14 of upper link 3.

Figure 3:
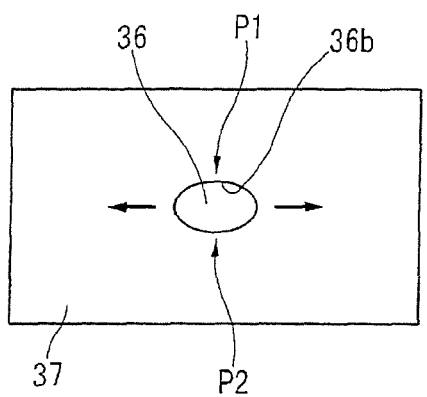
FIG. 3 is an explanatory view illustrating the developed crankpin bearing surface of the double-link piston crank mechanism for the internal combustion engine according to the invention.
Figure 4:
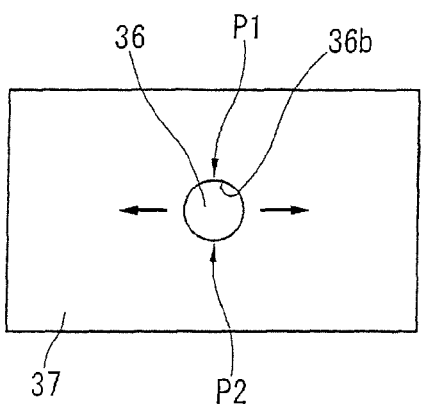
FIG. 4 is an explanatory view illustrating the developed crankpin bearing surface of a double-link piston crank mechanism for an internal combustion engine in a comparative example.

Additionally, lower-link oil passage 36 is formed as a through hole orthogonal to mating faces of the pair of lower-link split members 10, 11, divided by the divided surface 9 of them. Therefore, in the embodiment, as shown in FIG. 3, the other-end-side opening 36b of lower-link oil passage 36 structured to open to the crankpin bearing surface 37 is formed into a slotted hole shape elongated along the circumferential direction of the crankpin bearing surface. By the way, assuming that lower-link oil passage 36 is formed along the radial direction of crankpin bearing surface 37, as shown in FIG. 4, the other-end-side opening 36b of lower-link oil passage 36 structured to open to the crankpin bearing surface 37 is formed into a substantially complete round shape. FIGS. 3 and 4 are explanatory views, each of which schematically illustrates the developed crankpin bearing surface 37 of lower link 2. The left-to-right direction of each of FIGS. 3 and 4 corresponds to the circumferential direction of crankpin bearing surface 37.

In the presence of load input as indicated by the arrows in FIGS. 3 and 4, tensile stresses along the circumferential direction of the crankpin bearing surface are produced in respective crankpin bearing surfaces 37. Therefore, owing to such tensile stresses, the other-end-side opening 36b of lower-link oil passage 36 is extended along the circumferential direction of the crankpin bearing surface. However, in the embodiment, the other-end-side opening 36b of lower-link oil passage 36 is formed into a slotted hole shape elongated along the circumferential direction of the crankpin bearing surface. Thus, the curvatures of portions P1 and P2, extended by the tensile stresses along the circumferential direction of the crankpin bearing surface, become relatively small.

Therefore, as compared to the configuration such that the other-end-side opening 36b of lower-link oil passage 36 is formed into a substantially complete round shape, it is possible to effectively alleviate concentration of stresses applied to the other-end-side opening 36b of lower-link oil passage 36, thus reducing the stresses produced in the other-end-side opening 36b of lower-link oil passage 36. As a whole, it is possible to improve the fatigue strength of lower link 2.

By the way, in the embodiment, the one-end-side opening 36a of lower-link oil passage 36 is also formed into a slotted hole shape. More concretely, the one-end-side opening 36a of lower-link oil passage 36 is formed into a slotted hole shape elongated along the longitudinal direction of pin-boss-facing surface 33. In the presence of load input, tensile stresses along the longitudinal direction of the pin-boss-facing surface are produced in the pin-boss-facing surface 33. Owing to such tensile stresses, the one-end-side opening 36a of lower-link oil passage 36 is extended along the longitudinal direction of the pin-boss-facing surface 33. However, the one-end-side opening 36a of lower-link oil passage 36 is formed into a slotted hole shape elongated along the longitudinal direction of the pin-boss-facing surface. Thus, the curvatures of portions, extended by the tensile stresses along the longitudinal direction of the pin-boss-facing surface, become relatively small, in the same manner as the other-end-side opening 36b as discussed above. Therefore, it is possible to effectively alleviate concentration of stresses applied to the one-end-side opening 36a of lower-link oil passage 36, thus reducing the stresses produced in the one-end-side opening 36a of lower-link oil passage 36. As a whole, it is possible to improve the fatigue strength of lower link 2.

Additionally, lower-link oil passage 36 is configured or arranged orthogonal to the divided surface 9. This facilitates machining of lower-link oil passage 36 in the divided surface 9, serving as an important position (a reference). As compared to the configuration in which lower-link oil passage 36 is formed in the radial direction of crankpin bearing surface 37, it is possible to reduce machining costs.

As shown in FIG. 1, the lower-link oil passage 36 is configured or arranged to be offset from the input position of an input load F1 applied to the lower link 2 when a maximum combustion load acts on the piston. Hence, it is possible to improve the fatigue strength of lower link 2.

Figure 5:
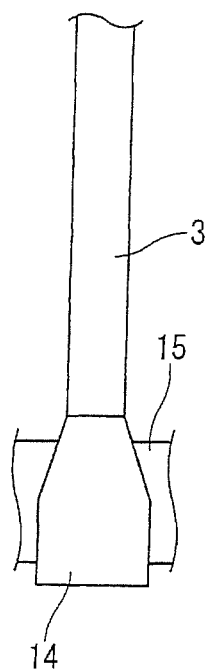
FIG. 5 is another enlarged explanatory view illustrating the essential part of the invention.

Furthermore, as shown in FIG. 5, the pin boss part 14, which is positioned on the other end side of upper link 3, is formed and tapered such that the thickness of the root (the basal end side) becomes relatively thinner, and thus the area of the bearing portion of the root (the basal end side) of pin boss part 14 is relatively lessened. Hence, when the pin boss part 14 passes through the spray area "S", lubricating oil can be fed into the bearing portion of pin boss part 14 of upper link 3 from the root of pin boss part 14 of upper link 3 as well as the pin-boss oil passage 35. Thus, it is possible to further improve the anti-seizing property of the pin boss part 14 of upper link 3.

By the way, the mechanism of the previously-discussed embodiment is configured such that lubricating oil is fed from the crankpin oil passage 31 to the connecting part of lower link 2 and upper link 3. In lieu thereof, the invention is applicable to a configuration such that lubricating oil is fed from the crankpin oil passage 31 to the connecting part of lower link 2 and control link 4. For instance, a pin-boss oil passage may be formed in the pin boss part 19, which is positioned on the other end side of control link 4. Additionally, another lower-link oil passage may be formed in the other-end-side pin boss part 21 of lower link 2 such that one end opens to the pin-boss-facing surface 34 provided between the forked sections of the other-end-side pin boss part 21 and the other end opens to the crankpin bearing surface 37. In this case, the another lower-link oil passage is structured to be brought into fluid-communication with the crankpin oil passage 31 at a prescribed crank angle. Additionally, the another lower-link oil passage is formed so as to point, at the above-mentioned prescribed crank angle, to a specified end edge of end edges of the other-end-side opening of the pin-boss oil passage formed in the pin boss part 19 of control link 4, the specified end edge facing on a traveling direction side of the pin boss part 19. However, regarding the magnitude of input load to lower link 2, the input load applied to the connecting part linked to the upper link 3 is relatively greater than that applied to the connecting part linked to the control link 4. Therefore, the lower-link oil passage, formed in the upper-link side, is relatively superior to the another lower-link oil passage in the stress-concentration reduction effect, obtained by forming the opening of the lower-link oil passage into a slotted hole shape.

Moreover, the invention is applicable to a double-link piston crank mechanism such that double-link piston crank mechanism 1 is not configured as a variable compression ratio mechanism.

The invention claimed is:

1. A double-link piston crank mechanism for an internal combustion engine comprising:
   a lower link rotatably installed on a crankpin of a crankshaft;
   an upper link rotatably connected at one end to a piston pin of a piston and rotatably connected at the other end configured as a pin boss part of the upper link to the lower link through a first connecting pin;
   a control link supported at one end by an engine body side and rotatably connected at the other end configured as a pin boss part of the control link to the lower link;
   a crankpin oil passage formed to radially extend inside of the crankpin, one end of the crankpin oil passage being structured to open to an outer circumferential surface of the crankpin;
   a pin-boss oil passage formed in at least one of the pin boss part of the upper link and the pin boss part of the control link, one end of the pin-boss oil passage being structured to open to an inner circumferential surface of the at least one pin boss part of the upper link and the pin boss part of the control link and the other end of the pin-boss oil passage being structured to open to an outer circumferential surface of the at least one pin boss part of the upper link and the pin boss part of the control link; and
   a lower-link oil passage formed in the lower link, one end of the lower-link oil passage structured to open to a pin-boss-facing surface facing the outer circumferential surface of the at least one pin boss part of the upper link and the pin boss part of the control link and the other end of the lower-link oil passage structured to open to a crankpin bearing surface,
   wherein the lower-link oil passage is configured to be brought into fluid-communication with the crankpin oil passage at a prescribed crank angle for jetting out lubricating oil from a one-end-side opening on the one end of the lower-link oil passage only at the prescribed crank angle,
   wherein the one-end-side opening of the lower-link oil passage is formed so as to point, at the prescribed crank angle, to a specified end edge of end edges of an other-end-side opening on the other end of the pin-boss oil passage as viewed in an axial direction of the crankshaft, the specified end edge facing a traveling direction side of the at least one pin boss part of the upper link and the pin boss part of the control link in which the pin-boss oil passage is formed.

2. The double-link piston crank mechanism for the internal combustion engine as recited in claim 1, wherein:
   the lower link comprises a half-split structural member structured by a pair of lower-link split members installed on the crankpin, sandwiching the crankpin between the lower-link split members, and
   the lower-link oil passage is formed as a through hole orthogonal to mating faces of the lower-link split members.

3. The double-link piston crank mechanism for the internal combustion engine as recited in claim 1, wherein:
   the lower-link oil passage is configured to be offset from an input position of an input load applied to the lower link when a maximum combustion load acts on the piston.

4. The double-link piston crank mechanism for the internal combustion engine as recited in claim 1, wherein:
   the one-end-side opening of the lower-link oil passage is formed into a slotted hole shape elongated along a longitudinal direction of the pin-boss-facing surface.

5. The double-link piston crank mechanism for the internal combustion engine as recited in claim 1, wherein:
   the one-end-side opening of the lower-link oil passage is formed so as to point, at the prescribed crank angle, to a specified end edge of end edges of the other-end-side opening of the other end of the pin-boss oil passage formed in the pin boss part of the upper link as viewed in the axial direction of the crankshaft, the specified end edge facing a traveling direction side of the pin boss part of the upper link.

6. The double-link piston crank mechanism for the internal combustion engine as recited in claim 5, wherein:
   the specified end edge of the end edges of the other-end-side opening of the pin-boss oil passage, facing the traveling direction side of the pin boss part of the upper link, corresponds to an end edge of the other-end-side opening facing the one end side of the upper link.

7. The double-link piston crank mechanism for the internal combustion engine as recited in claim 1, wherein:
   the at least one pin boss part is formed and tapered such that a thickness of its root is relatively thinned and that an area of a bearing portion of the root of the at least one pin boss part is relatively lessened.

* * * * *